(12) United States Patent
Nishioka (10) Patent No.: US 12,173,473 B2
(45) Date of Patent: Dec. 24, 2024

(54) ARRANGEMENT STRUCTURE FOR A CONSTRUCTION MACHINE COOLING FAN

(71) Applicant: Caterpillar SARL, Geneva (CH)

(72) Inventor: Takuya Nishioka, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 17/768,205

(22) PCT Filed: Oct. 8, 2020

(86) PCT No.: PCT/EP2020/025450
§ 371 (c)(1),
(2) Date: Apr. 11, 2022

(87) PCT Pub. No.: WO2021/069101
PCT Pub. Date: Apr. 15, 2021

(65) Prior Publication Data
US 2024/0084552 A1    Mar. 14, 2024

(30) Foreign Application Priority Data
Oct. 10, 2019   (JP) ................................. 2019-186665

(51) Int. Cl.
*B60K 11/04*   (2006.01)
*B60K 11/08*   (2006.01)
*E02F 9/08*    (2006.01)

(52) U.S. Cl.
CPC ............ *E02F 9/0891* (2013.01); *B60K 11/04* (2013.01); *B60K 11/085* (2013.01); *E02F 9/0866* (2013.01)

(58) Field of Classification Search
CPC ...... B60K 13/02; B60K 11/04; B60K 11/085; F02M 35/164; F01P 11/12; F01P 2001/005; E02F 9/0891; E02F 9/0866; E02F 9/08
(Continued)

(56) References Cited

U.S. PATENT DOCUMENTS 7,204,329 B2 * 4/2007 Pfohl .................... B60K 11/04
                                                  180/69.24
10,584,465 B2 * 3/2020 Sakon ................... B60K 11/02
(Continued)

FOREIGN PATENT DOCUMENTS

EP     3360711 A1     8/2018
JP    2005297644 A   10/2005
(Continued)

OTHER PUBLICATIONS

Translation of JP-2015140643-A. Accessed at www.espacenet.com on Apr. 23, 2024. (Year: 2015).*
(Continued)

*Primary Examiner* — James A Shriver, II
*Assistant Examiner* — Hilary L Johns (57) ABSTRACT

To achieve the improvement of maintainability, simplification of structure, upon arranging a cooling fan on an outdoor side of a heat exchanger. To configure such that heat exchangers are arranged so as to face an openable/closable cover in a closed state, in a main accommodating chamber having an opening part which is opened or closed by the openable/closable cover; on the other hand, cooling fans are mounted in the operable/closable cover, and the cooling fans faces heat exchangers to supply cooling air in the closed state of the openable/closable cover; on the other hand, the cooling fans are separated from the heat exchangers in an open state of the openable/closable cover to allow the heat exchangers to be accessible from the opening part.

7 Claims, 9 Drawing Sheets

(58) Field of Classification Search
USPC ........................................................ 180/68.1
See application file for complete search history.

(56) References Cited

U.S. PATENT DOCUMENTS

| | | | |
|---|---|---|---|
| 2005/0211483 A1* | 9/2005 | Pfohl | F02M 35/10157 |
| | | | 180/68.1 |
| 2007/0007061 A1* | 1/2007 | Meyer | F01P 3/18 |
| | | | 180/68.1 |
| 2012/0211292 A1* | 8/2012 | Werner | B60K 11/04 |
| | | | 180/68.1 |
| 2018/0266076 A1* | 9/2018 | Sakron | B60K 11/02 |

FOREIGN PATENT DOCUMENTS

| | | | |
|---|---|---|---|
| JP | 2008025416 A | | 2/2008 |
| JP | 2015140643 A | * | 8/2015 |
| JP | 2017128928 A | | 7/2017 |
| WO | 2018123021 A1 | | 7/2018 |

OTHER PUBLICATIONS

International Search Report related to Application No. PCT/EP2020/025450; reported on Feb. 22, 2021.

* cited by examiner

ARRANGEMENT STRUCTURE FOR A CONSTRUCTION MACHINE COOLING FAN

CROSS-REFERENCE TO RELATED APPLICATION

This Application is a 35 USC § 371 US National Stage filing of International Application No. PCT/EP2020/025450 filed on Oct. 8, 2020 which claims priority under the Paris Convention to Japanese Patent Application No. No. 2019-186665 filed on Oct. 10, 2019.

FIELD OF THE INVENTION

The present invention relates to the technical field of an arrangement structure of cooling fan that supplies cooling air to a heat exchanger.

BACKGROUND OF THE INVENTION

Generally, a construction machine such as a power shovel is provided with various types of heat exchangers such as an oil cooler and a radiator, a condenser for air conditioner, and cooling fans for supplying cooling air to these heat exchangers. As such a cooling fan, a fan that is interlockingly coupled to an engine output shaft via a belt, a fan that is rotated by a hydraulic motor, and the like have been conventionally for general use, but in recent years, from viewpoints of increasing use of electric power shovels with no engine mounted, degree of freedom of layout, ease of speed control, etc., a DC motor type electric fan is also used. Furthermore, upon arranging these cooling fan and heat exchanger in a vehicle body, in the case of a fan that is interlockinly coupled with an engine output shaft, it is configured such that a heat exchanger is usually arranged on an outdoor side of the fan inside an engine room, and the heat exchanger and the inside of the engine room are cooled by sucking outside air by the fan. On the other hand, in the case in which like an electric fan, it is required to arrange the fan on an upstream side of the cooling air from the heat exchanger so that electronic components are not easily affected by heat, or for the convenience of the layout, a cooling fan that is arranged on an outdoor side of the heat exchanger is also known (see, for example, Patent Literature 1).

Meanwhile, since a construction machine such as a power shovel is often used at a harsh work site where soil and sand and dust, etc. are scattered, a heat exchanger is easily clogged, and regular maintenance including cleaning, inspection, and repair is required. For this reason, usually, it is required to configure such that there is provided an opening part that enables access from vehicle outside to an accommodating chamber in which the heat exchanger is accommodated, and the opening part is covered by a cover that is freely openable and closable, and maintenance of the heat exchanger can be performed from the opening part by opening the cover. In this case, if the heat exchanger is arranged on an outdoor side of the cooling fan, the heat exchanger can be easily accessed from the opening part only by opening the cover. However, as disclosed in the above-mentioned Patent Literature 1, if the cooling fan is arranged on an outdoor side of the heat exchanger, the heat exchanger cannot be accessed due to hindrance by the cooling fan. At the time of maintenance of the heat exchanger, it is necessary to remove the cooling fan or an entire casing in which the cooling fan is assembled, and there is a problem that time and labor is required and maintainability is deteriorated.

On the other hand, in a construction machine (wheel loader) in which a cooling fan is arranged on an outdoor side of a heat exchanger, there is proposed a blower unit which incorporates the cooling fan is configured to be rotatable in a closed position that faces a back surface of the heat exchanger and an open position that exposes a back surface of the heat exchanger (see, for example, Patent Literature 2). In this construction machine, even if the cooling fan is arranged on the outdoor side of the heat exchanger, the heat exchanger can be accessed from the opening part by bringing the blower unit into the open position.

PRIOR ART LITERATURES

Patent Literatures

[PATENT LITERATURE 1] Japanese Patent Application Laid-Open No. 2015-140643
[PATENT LITERATURE 2] International Publication No. WO2018/123021

SUMMARY OF THE INVENTION

Problems to be Solved by the Invention

However, the construction machine disclosed in the above-mentioned Patent Literature 2, upon performing maintenance of the heat exchanger, requires two stages of opening operations: first, opening a cover (grille) for covering an opening part so as to be freely openable/closable, then causing the blower unit to be positioned at the open position. Besides, two opening/closing mechanisms: a mechanism for opening/closing the cover, and a mechanism for opening/closing the blower unit are required, accordingly there are problems that the number of parts increases and the structure becomes complicated, where there are problems to be solved by the invention.

Means for Solving the Problem

The present invention has been created with an aim of solving these problems in view of the above situation, the invention is an arrangement structure of cooling fan configured such that, in a construction machine equipped with a heat exchanger arranged in an accommodating chamber having an opening part, an openable/closable cover for covering the opening part so as to be freely openable and closable, and a cooling fan for supplying cooling air to the heat exchanger, upon arranging the cooling fan on an outdoor side of the heat exchanger, the heat exchanger is arranged at a position facing the openable/closable cover in a closed state, and the cooling fan is mounted in the openable/closable cover, wherein in the closed state of the openable/closable cover, the cooling fan faces the heat exchanger to supply cooling air; on the other hand, in an open state of the openable/closable cover, the cooling fan mounted in the openable/closable cover is separated from the heat exchanger to allow the heat exchanger to be accessible from the opening part.

The invention is the arrangement structure of cooling fan according to, wherein the openable/closable cover is of a closed cross-section structure provided with an inner side surface and an outer side surface, and the cooling fan is mounted on the inner side surface of the openable/closable cover; on the other hand, the outer side surface of the openable/closable cover has ventilation holes through which the cooling air passes.

The invention of is the arrangement structure of cooling fan, wherein the cooling fan is mounted on the inner side surface of the openable/closable cover, in a state where the most part is fit into a space part formed between the inner side surface and the outer side surface of the closed cross-section structure.

The invention is the arrangement structure of cooling fan, wherein on an outer peripheral side of the heat exchanger, there is provided a duct member which forms an air duct between the heat exchanger and the cooling fan by abutting on the openable/closable cover on the outer peripheral side of the cooling fan in the closed state of the openable/closable cover; on the other hand, there is provided an airtight member at an abutting part between the duct member and the openable/closable cover.

The invention is the arrangement structure of cooling fan, wherein on the openable/closable cover on the outer peripheral side of the cooling fan, there is provided a duct member which forms an air duct between the heat exchanger and the cooling fan by abutting on the outer peripheral side of the heat exchanger in the closed state of the openable/closable cover; on the other hand, there is provided an airtight member in an abutting part between the duct member and the heat exchanger.

The invention of is the arrangement structure of cooling fan, wherein the cooling fan is an electric fan driven by an electric motor.

The invention of is the arrangement structure of cooling fan, wherein a plurality of cooling fans is mounted in the openable/closable cover.

The invention is the arrangement structure of cooling fan, wherein the openable/closable cover is supported in an openable/closable and swingable manner via a hinge, on a heat exchanger or a heat exchanger supporting member for mounting and supporting the heat exchanger onto an accommodating chamber.

Favorable Effects of the Invention

According to the invention, the improvement of maintainability and the simplification of structure can be achieved, although a cooling fan is arranged on an outdoor side of a heat exchanger.

According to the invention, a cooling fan can be easily mounted to the openable/closable cover having ventilation holes, and the rigidity of the openable/closable cover can be also increased.

According to the invention, the cooling fan can be effectively protected and the amount of protrusion of the cooling fan from an inner side surface to an indoor side of the openable/closable cover can be suppressed.

According to the invention, even if the heat exchanger and the cooling fan are separated from each other when the openable/closable cover is opened, an airtight air duct can be formed between the heat exchanger and the cooling fan in a closed state of the openable/closable cover, which can contribute to the improvement of cooling efficiency.

According to the invention, an electric fan can be arranged in a state where it is hardly affected by heat.

According to the invention, it is possible to provide the number of cooling fans corresponding to the number, capacity, and type of heat exchangers.

According to the invention of, a positional relationship between the heat exchanger and the cooling fan that is mounted in the openable/closable cover can be easily adjusted, and the heat exchanger or the heat exchanger supporting member also serves as a support frame of the openable/closable cover, thereby dual use of members can be achieved.

DETAILED DESCRIPTION OF THE INVENTION

Figure 1:
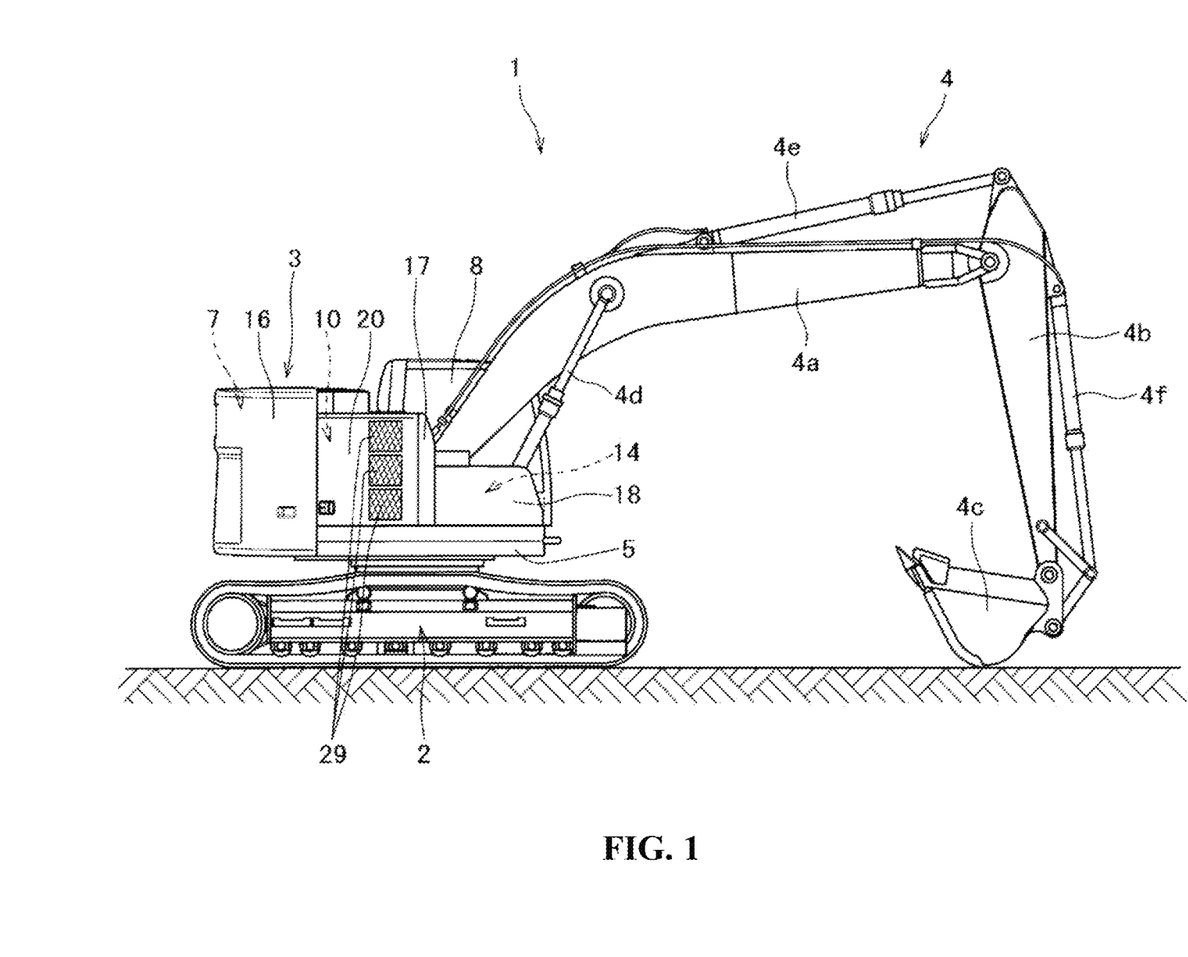
FIG. 1 is a side view of a power shovel.

Hereinbelow, an embodiment of the present invention will be described with reference to the drawings. In figures, reference numeral 1 denotes a power shovel which is an example of a construction machine, and the power shovel 1 is an electric shovel which uses electric power as a power source in the present embodiment. The power shovel 1 is composed of a lower traveling structure 2 of a crawler type, an upper revolving structure 3 which is supported in a freely revolvable manner by the lower traveling structure 2, a front working unit 4 installed on the upper revolving structure 3, and so on. The front/rear and left/right directions in the following description are based on the front/rear and left/right directions of the upper revolving structure 3.

Figure 2:
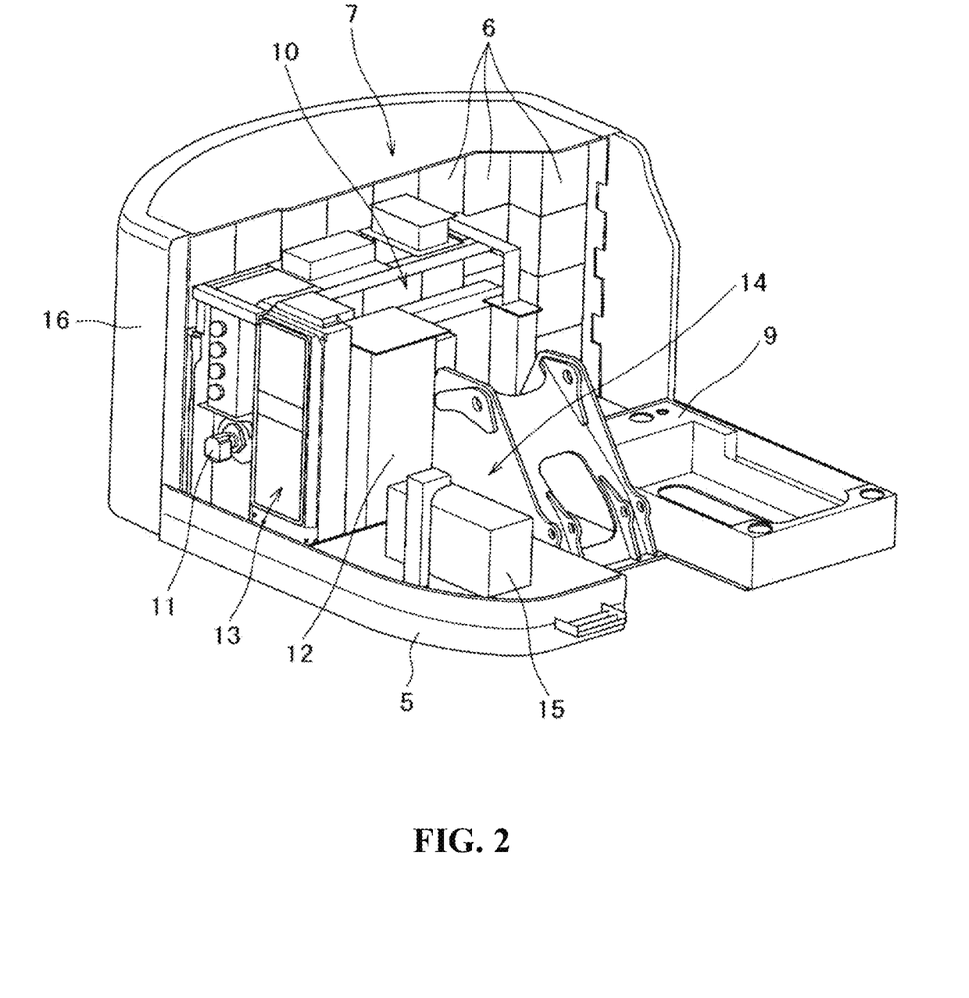
FIG. 2 is a view illustrating an arrangement state of devices in an upper revolving structure.

Reference numeral 5 denotes a revolving frame that serves as a pedestal for the upper revolving structure 3, and in the rear part of the revolving frame 5, there is provided a battery accommodating chamber 7 in which batteries 6 serving as a power source are accommodated. On the front left side of the battery accommodating chamber 7, there is provided a cab mounting part 9 on which a cab 8 is mounted. In addition, on the front central portion in the lateral direction and front right side of the battery accommodating chamber 7, there is provided a main accommodating chamber 10. The main accommodating chamber 10 accommodates various devices and tanks including a motor (not shown) that is driven by power supplied from the batteries 6, a hydraulic pump 11 driven by the motor, a hydraulic oil tank 12, a heat exchanger unit 13 and so on described below. Furthermore, on the front right side of the main accommodating chamber 10, there is provided a valve accommodating chamber 14. The valve accommodating chamber 14 accommodates a control valve 15 for controlling feed and discharge of oil to and from various hydraulic actuators provided in the power shovel 1 (for example, a boom cylinder 4*d*, an arm cylinder 4*e*, a bucket cylinder 4*f* that are operable to extend and retract in order to cause a boom 4*a*, an arm 4*b*, a bucket 4*c* each constituting the front working unit 4 to be swung respectively, and a traveling motor (not shown) that is driven in order to cause the lower traveling structure 2 to travel).

The battery accommodating chamber 7, the main accommodating chamber 10, and the valve accommodating chamber 14 are covered by exterior covers 16, 17, and 18, respectively, but the right-side surface of the exterior cover 17 that covers the main accommodating chamber 10 has a large opening part 19. The opening part 19 is covered in a freely openable and closable manner by an openable/closable cover 20 described below. In the present embodiment, the main accommodating chamber 10 corresponds to an accommodating chamber having an opening part of the present invention.

Figure 3:
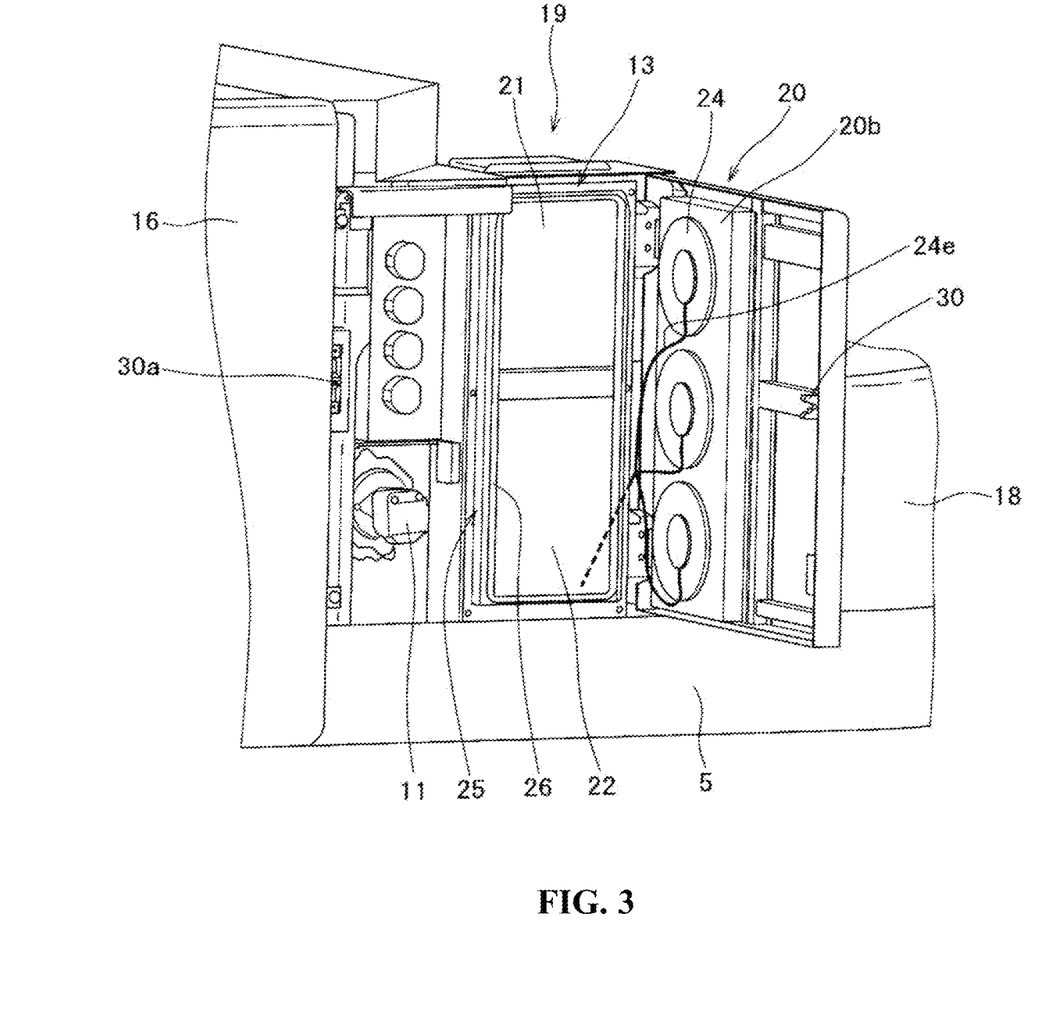
FIG. 3 is a principal part perspective view in a state where the openable/closable cover is opened.
Figure 5:
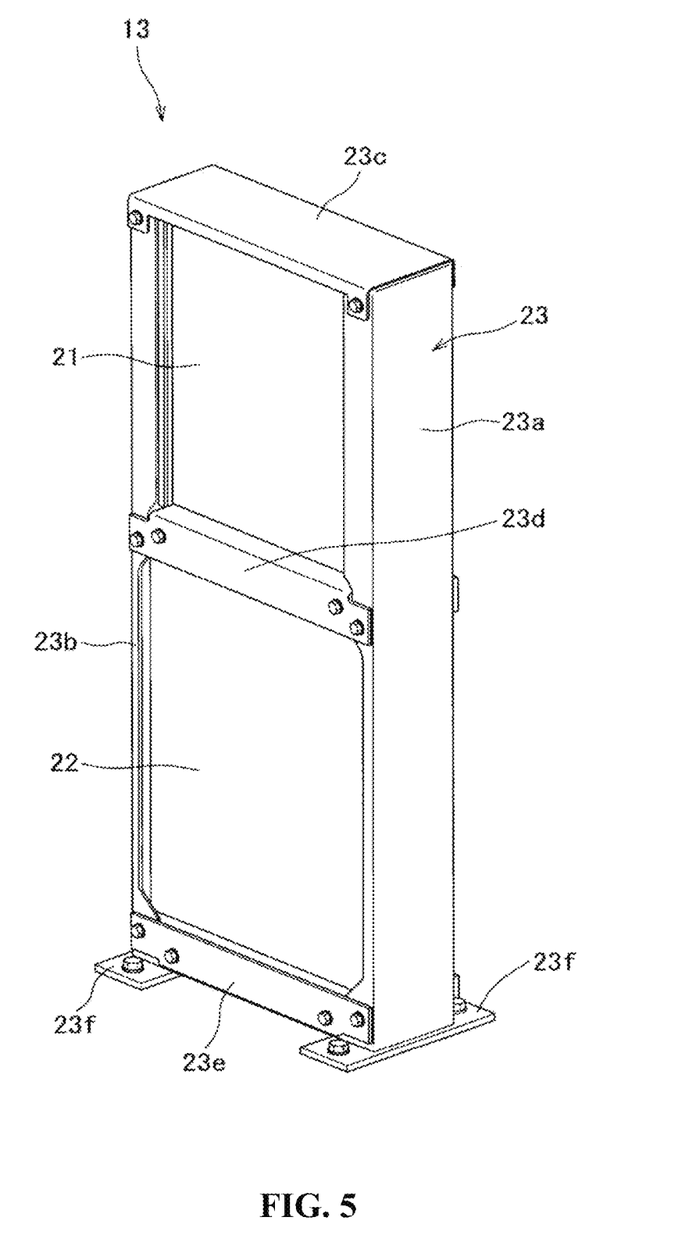
FIG. 5 is a view illustrating a heat exchanger unit.

In the present embodiment, the heat exchanger unit 13 is composed of first and second heat exchangers 21, 22 arranged vertically adjacent to each other, and a heat exchanger supporting frame (corresponding to a heat exchanger supporting member of the present invention) 23 for mounting and supporting the first and second heat exchangers 21, 22 on a floor frame 5a (a part of the revolving frame 5) of the main accommodating chamber 10. The heat exchanger unit 13 is arranged at the right-side end of the main accommodating chamber 10 in a state of being adjacently facing the front half side of the opening part 19 of the exterior cover 17. Consequently, by opening the openable/closable cover 20 that covers the opening part 19 in a freely openable and closable manner, the heat exchanger unit 13 is adapted to be easily accessible from the opening part 19. In this embodiment, an oil cooler for cooling hydraulic oil and a condenser for air conditioner are provided as the first and second heat exchangers.

The heat exchanger supporting frame 23 is composed of a pair of front and rear vertical frames 23a, 23b, an upper frame 23c that connects upper portions of the vertical frames 23a, 23b, and an intermediate frame 23d that connects upper and lower intermediate portions of the vertical frames 23a, 23b, a lower frame 23e that connects the lower portions of the vertical frames 23a, 23b, a fixed metal fitting 23f for fixing the lower ends of the vertical frames 23a, 23b to the floor frame of the main accommodating chamber 10, and others. Inside the frame formed by the above-mentioned front and rear vertical frames 23a, 23b, the upper frame 23c, the intermediate frame 23d, and the lower frame 23e, the first heat exchanger 21 and the second heat exchanger 22 are incorporated in a state where the former is located on the upper side and the latter on the lower side.

Furthermore, in the heat exchanger supporting frame 23, there is attached a duct (corresponding to a duct member of the present invention) 25 that forms an air duct between the first and second heat exchangers 21, 22 and a cooling fans 24 described below. The duct 25 comprises a duct body part 25a in a short square cylinder shape extending from the heat exchanger supporting frame 23 toward the opening part 19 so as to surround the outer peripheral sides of the first and second heat exchangers 21, 22, a flange portion 25b formed on the proximal end side of the duct body part 25a and fixed by a screw to the heat exchanger supporting frame 23, and an airtight member installing portion 25c formed on the distal end side of the duct body part 25a. An airtight member 26 made of an elastic material is installed at the airtight member installing portion 25c. The airtight member 26 is adapted to abut on the openable/closable cover 20 in the closed state to ensure airtightness of the air duct, and to function as a cushioning material when the duct 25 and the openable/closable cover 20 abuts on each other.

Furthermore, a pair of upper and lower hinges 27 for supporting the openable/closable cover 20 in a freely openable and closable manner are attached via hinge brackets 28 respectively, to the vertical frame 23a on the front side of the heat exchanger supporting frame 23. The hinge bracket 28 is formed to include a first mounting piece 28a mounted to a bracket mounting seat 23g fixed to the vertical frame 23a on the front side of the heat exchanger supporting frame 23, and a second mounting piece 28b mounted to one hinge piece 27b of the hinge 27, and a connecting piece portion 28c for connecting the upper and lower ends of the first and second mounting pieces 28a, 28b to each other. Also, the hinge 27 is formed of a hinge pin 27a, one hinge piece 27b mounted to the second mounting piece 28b of the hinge bracket 28, and the other hinge piece 27c mounted to the hinge mounting portion 20a at the front edge end of the openable/closable cover 20.

Figure 4:
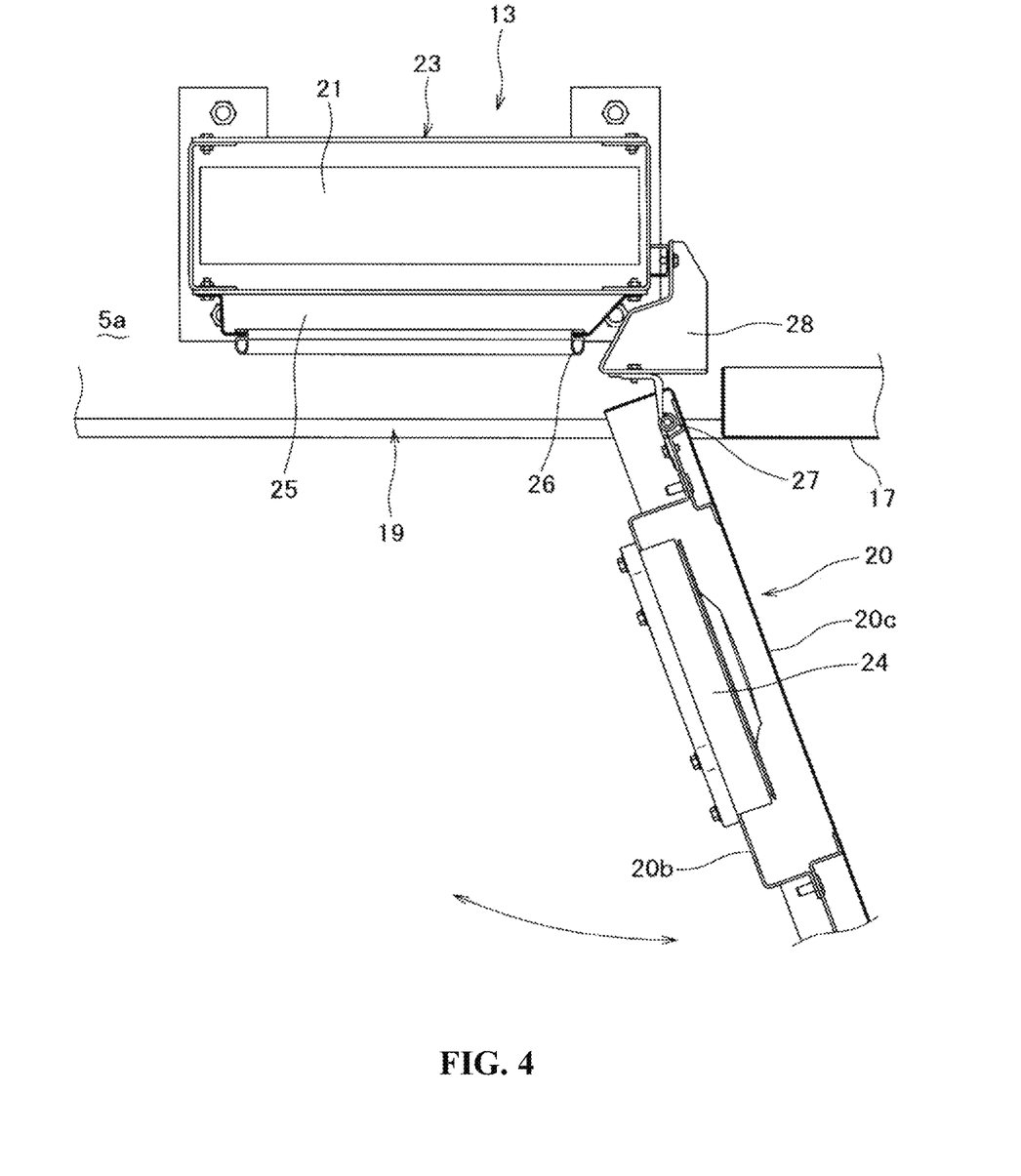
FIG. 4 is a principal part cross-sectional view in a state where the openable/closable cover is opened.

On the other hand, the openable/closable cover 20 is used to cover in a freely openable/closable manner the opening part 19 on the right side surface of the main accommodating chamber 10 as described above, and on the front edge end thereof, there is formed a hinge mounting portion 20a to which the other hinge piece 27c of the hinge 27 is mounted. Then the openable/closable cover 20 is supported in an openable/closable and swingable manner by the front vertical frame 23a of the heat exchanger supporting frame 23, via the hinge 27 mounted to the hinge mounting portion 20a. In the closed state in which the openable/closable cover 20 closes the opening part 19, the heat exchanger unit 13 arranged in the main accommodating chamber 10 so as to adjacently face the front half side of the opening part 19 as described above, is adapted to adjacently face the openable/closable cover 20 at a predetermined interval.

Figure 6:
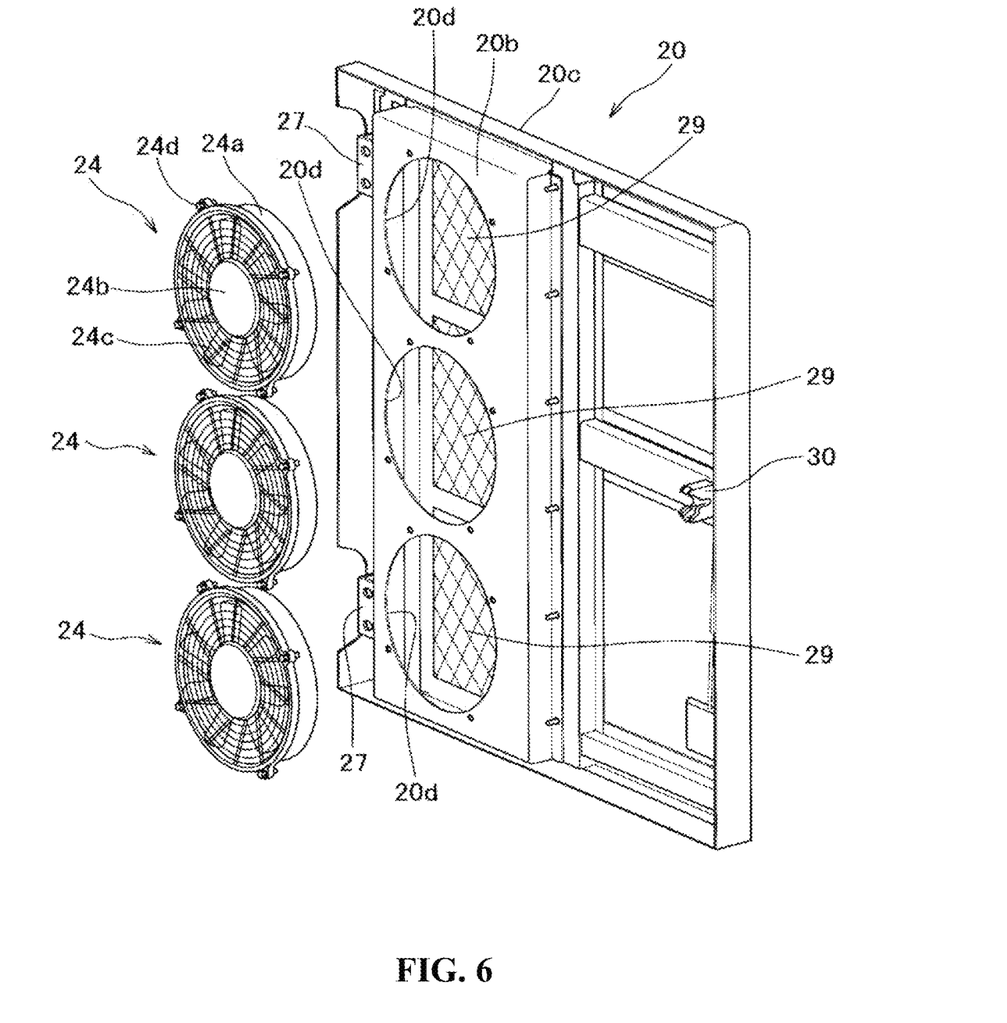
FIG. 6 is a view illustrating how the cooling fan is mounted to the openable/closable cover.

Here, the front half side of the openable/closable cover 20, which the heat exchanger unit 13 faces, is formed in a closed cross-section structure including an inner side surface 20b and an outer side surface 20c, and in the inner side surface 20b, there is formed a fan mounting hole 20d in which the cooling fan 24 is mounted; on the other hand, on the outer side surface 20c, there is attached a ventilation plate 29 having a punching metal structure having ventilation holes through which the cooling air passes. In the present embodiment, three sets of cooling fans 24 are provided in a state of being lined up in the vertical direction, and three fan mounting holes 20d are provided corresponding to the three sets of cooling fans 24, and the ventilation plate 29 is attached at a position located on a vehicle outside of each fan mounting hole 20d.

The cooling fan 24, wherein an electric fan is adopted in the present embodiment, is configured to include a short cylinder-shaped fan shroud 24a, an electric motor 24b arranged in the central portion of the fan shroud 24a, and a plurality of rotating blades 24c driven by the electric motor 24b arranged inside the cylinder of the fan shroud 24a, and others. On an outer peripheral portion of the fan shroud 24a, there is formed a mounting seat 24d for fixing the cooling fans 24 to an outer peripheral portion of the fan mounting hole 20d of the openable/closable cover 20. The mounting seat 24d is adapted to abut on the inner side surface 20b on the outer peripheral side of the fan mounting hole 20d when the fan shroud 24a is fitted into the fan mounting hole 20d of the openable/closable cover 20. By fixing the abutted mounting seat 24d with screw, the cooling fans 24 is adapted to be attached and fixed to the inner side surface 20b in a state where the most part thereof is fitted into a space part formed between the inner side surface 20b and the outer side surface 20c of the closed cross-section structure. An electric wire 24e (shown in FIG. 3) connected to the electric motor 24b of the cooling fans 24 is adapted to be guided into the main accommodating chamber 10 passing through the vicinity of the hinge 27 so that the electric wire 24e may not be pulled or may not hinder when the openable/closable cover 20 is opened and closed.

Figure 7:
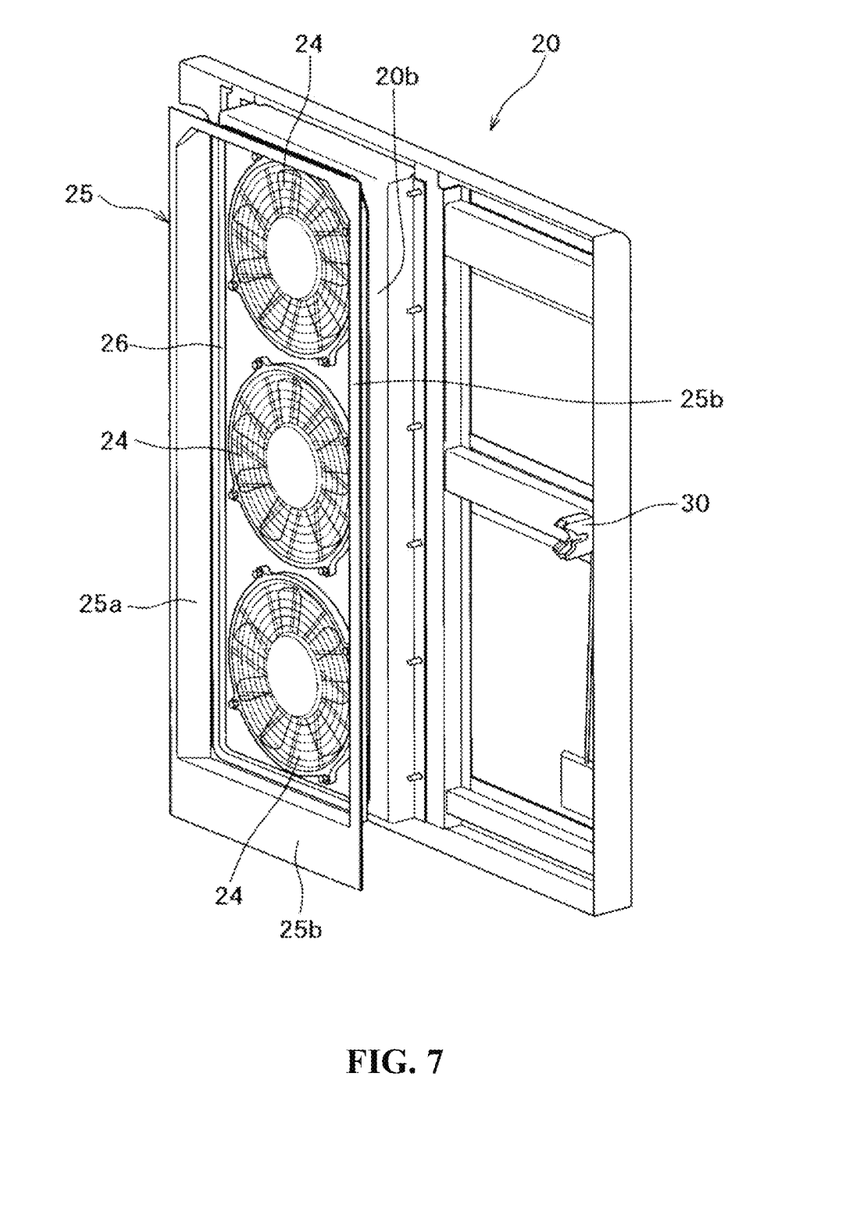
FIG. 7 is a view illustrating a duct in a state of abutting on the openable/closable cover.
Figure 8:
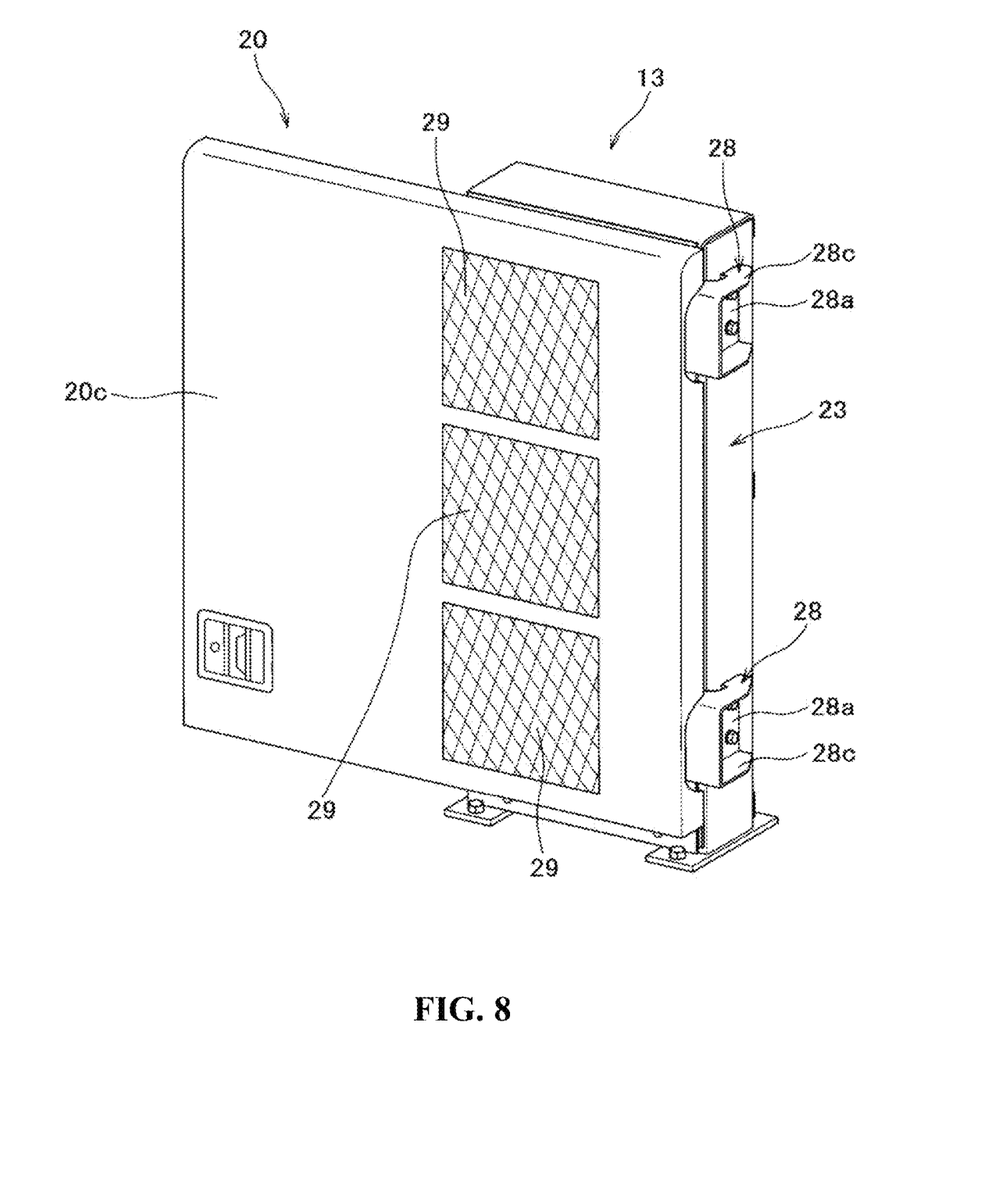
FIG. 8 is a view illustrating the openable/closable cover in a closed state and the heat exchanger unit.
Figure 9:
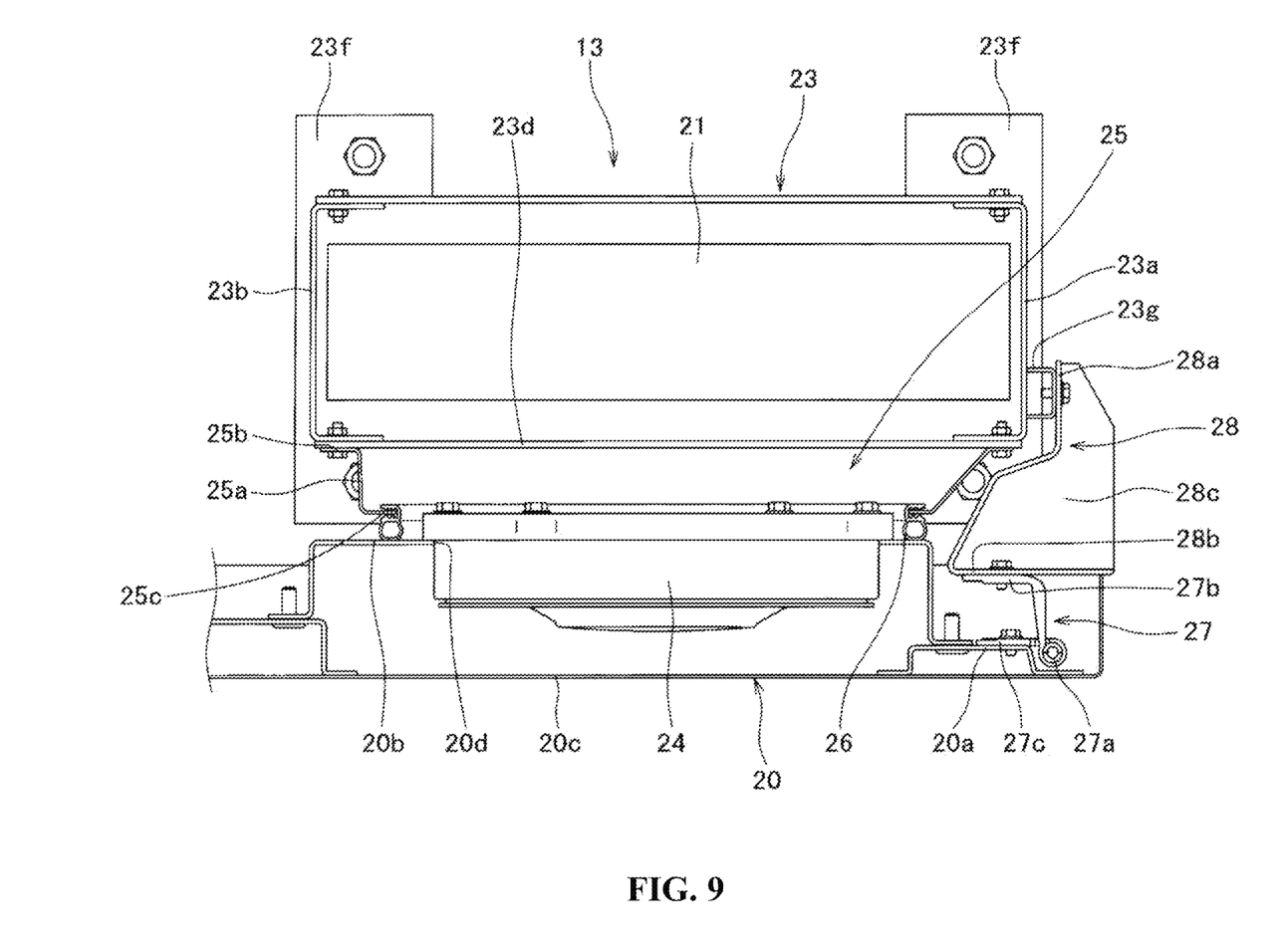
FIG. 9 is a horizontal cross-sectional view of FIG. 8.

The cooling fan 24 attached to the inner side surface 20b of the openable/closable cover 20 adjacently faces the heat exchanger unit 13 provided to face at a predetermined interval the openable/closable cover 20 in the closed state as described above, by closing the openable/closable cover 20. When the cooling fan 24 is driven in this state, outside air is sucked through the ventilation holes of the ventilation plate 29, and the sucked outside air serving as cooling air is adapted to be supplied to the first and second heat exchangers 21, 22. Furthermore, in the closed state of the openable/closable cover 20, the airtight member 26 attached to the distal end of the duct 25 described above abuts on the inner side surface 20b of the openable/closable cover on the outer peripheral side of the cooling fans 24, whereby an air duct is formed between the first and second heat exchangers 21, 22 and the cooling fans 24 so that efficient cooling can be performed. On the other hand, when the openable/closable cover 20 is opened, the cooling fans 24 attached to the openable/closable cover 20 are separated from the heat exchanger unit 13, whereby the first and second heat exchangers 21, 22 are adapted to be exposed and easily accessible from vehicle outside.

In figures, reference numeral 30 denotes a latch attached to the rear end portion of the openable/closable cover 20, and 30a denotes a latch receiving portion attached to a frame erected in the main accommodating chamber 10, and the latch 30 engages with the latch receiving portion 30a when the openable/closable cover 20 is closed, whereby the openable/closable cover 20 is adapted to be held in the closed state.

In the present form configured as described above, the power shovel 1 includes the heat exchangers (first and second heat exchangers) 21, 22, and the cooling fans 24 that supply cooling air to the heat exchangers 21, 22. The main accommodating chamber 10, in which the heat exchangers 21, 22 are accommodated, has the opening part 19, and the opening part 19 is covered by the openable/closable cover 20 that is freely openable/closable. In the power shovel 1, when the cooling fans 24 are disposed in an outdoor side of the heat exchangers 21, 22, the heat exchangers 21, 22 are arranged at positions that face the openable/closable cover 20 in the closed state; on the other side, the cooling fans 24 are attached to the openable/closable cover 20, and the cooling fans 24 face the heat exchangers 21, 22 to supply cooling air in the closed state of the openable/closable cover 20; on the other hand, in the open state of the openable/closable cover 20, the heat exchangers 21, 22 can be easily accessed from the opening part 19, by the cooling fans 24 mounted in the openable/closable cover 20 being separated from the heat exchangers 21, 22.

As described above, in the present form, the cooling fans 24 are disposed on the outdoor side of the heat exchangers 21, 22, by mounting the cooling fans 24 in the openable/closable cover 20, whereby the electric motors 24b constituting the cooling fans 24 are designed to be less susceptible to heat. However, when performing maintenance such as cleaning, inspection, and repair of the heat exchangers 21, 22, the heat exchangers 21, 22 can be easily accessed from the opening part 19 simply by opening the openable/closable cover 20 that covers the opening part 19 in a freely openable/closable manner, which can greatly contribute to the improvement of maintainability. Furthermore, since the cooling fans 24 are mounted in the openable/closable cover 20, there is no need for a dedicated operation or mechanism for opening/closing the cooling fans 24 themselves, and the operation is simpler, on top of that, which can contribute to the reduction of the number of parts and the simplification of structure.

Furthermore in the power shovel 1, the openable/closable cover 20 is formed of a closed cross-section structure including the inner side surface 20b and the outer side surface 20c, and the cooling fans 24 are mounted on the inner side surface of the openable/closable cover 20; on the other side, on the outer side surface 20c of the openable/closable cover 20, there are attached ventilation plates 29 having ventilation holes through which the cooling air passes. By forming the openable/closable cover 20 having the closed cross-section structure in this manner, the cooling fans 24 can be easily mounted to the openable/closable cover 20 having the ventilation holes, and the rigidity of the openable/closable cover 20 can be increased. Furthermore, in this case, the cooling fans 24 are configured to be mounted on the inner side surface 20b in a state where the most part thereof is fitted into the space part formed between the inner side surface 20b and the outer side surface 20c of the closed cross-section structure. Consequently, the cooling fans 24 can be effectively protected, and the amount of protrusion of the cooling fans 24 from the inner side surface 20b of the openable/closable cover to the indoor side can be suppressed.

Furthermore in the power shovel 1, on the outer peripheral side of the heat exchangers 21, 22 (in the present embodiment, the heat exchanger supporting frame 23 on which the heat exchangers 21, 22 are mounted), there is provided the duct 25 that forms the air duct between the heat exchangers 21, 22 and the cooling fans 24 by abutting on the openable/closable cover 20 on the outer peripheral side of the cooling fans 24 in the closed state of the openable/closable cover 20, and in the duct 25, there is provided an airtight member 26 at an abutting part with the openable/closable cover 20. Consequently, even if the heat exchangers 21, 22 and the cooling fans 24 are separated from each other when the openable/closable cover 20 is opened, the airtight air duct can be formed between the heat exchangers 21, 22 and the cooling fans 24 in the closed state of the openable/closable cover 20, which can contribute to the improvement of cooling efficiency.

Furthermore, the openable/closable cover 20 is supported in an openable/closable and swingable manner via a hinge 27, on the heat exchanger supporting frame 23 for mounting and supporting the heat exchangers 21, 22 in the main accommodating chamber 10. Consequently, for example, adjustment of a positional relationship between the heat exchangers 21, 22 and the cooling fans 24 mounted to the openable/closable cover 20 can be more easily performed than the case of causing the openable/closable cover to be supported in a openable/closable and swingable manner on a vehicle body side frame, and the heat exchanger supporting frame 23 serves for a support frame of the openable/closable cover 20, and dual use of members can be achieved.

It is a matter of course that the present invention is not limited to the above embodiment. Although the duct is provided on the outer peripheral side of the heat exchanger, in the above embodiment, it may be configured to provide a duct member that forms an air duct between the heat exchanger and the cooling fan by abutting on the outer peripheral side of the heat exchanger in the closed state of the openable/closable cover, in the openable/closable cover on the outer peripheral side of the cooling fan. On the other hand, the airtight member can be provided configured at the abutting part between the duct member and the heat exchanger. Furthermore, in the above embodiment, although a duct member is installed on the duct side, it may be configured to provide an airtight member on the openable/closable cover side or on the heat exchanger side that abuts on the duct.

Further, in the above embodiment, the first and second heat exchangers 21, 22 are shown as the heat exchangers arranged in the accommodating chamber, and an oil cooler and a condenser for air conditioner are illustrated as the first and second heat exchangers. However, the number of heat exchangers, the type of heat exchangers, an arrangement relationship between heat exchangers when a plurality of heat exchangers is provided, and the like are properly set depending on a construction machine on which heat exchangers are mounted. For example, in a construction machine equipped with an engine, a radiator or an intercooler is provided as a heat exchanger. Further, as an arrangement of a plurality of heat exchangers, the heat exchangers may be arranged so as to be adjacent right and left with respect to the flow of cooling air, or may be arranged so as to be overlapped front and back with respect to the flow of cooling air.

Further, in the above embodiment, three cooling fans are provided so as to be lined up vertically, but the number and arrangement of cooling fans are properly set in correspondence with the number, capacity, type, and the like of heat exchangers. Furthermore, in the above embodiment, although an electric fan is adopted as a cooling fan, even if a fan driven by a hydraulic motor is used, for example, without being restricted to an electric fan, the present invention can be implemented, in a case where it is desired to arrange a cooling fan on an outdoor side of the heat exchanger for convenience of layout.

Further, in the above embodiment, the openable/closable cover is configured in such a way that the same is supported in an openable/closable and swingable manner by the heat exchanger supporting frame (heat exchanger supporting member). However, in a case where a heat exchanger supporting member such as the one in the above embodiment is not provided, and an outer contour of a heat exchanger itself has a strong structure, the openable/closable cover can be configured in such a way that the same is supported in an openable/closable and swingable manner by the outer contour of the heat exchanger itself. Furthermore, in the above embodiment, the openable/closable cover is configured in such a way that the same is provided in a state where its plane direction faces a front-rear direction, and is opened/closed and swung using a front edge part side as a fulcrum, but a configuration for opening/closing and swinging using a rear edge part side, alternatively an upper edge part side or a lower edge part side as a fulcrum may be possible. Also, if an openable/closable cover provided in a state where its plane direction faces the left-to-right direction is used, a configuration for opening/closing and swinging using a left edge part side or a right edge part side as a fulcrum may be of course possible.

In the above embodiment, upon providing the ventilation holes on the outer side surface of the openable/closable cover, the ventilation plates having the ventilation holes are configured to be attached, to the outer side surface thereof However, it is a matter of course that the ventilation holes may be formed on the outer side surface itself.

Furthermore, the present invention can be implemented in various types of construction machines provided with a heat exchanger, without being limited to a power shovel.

INDUSTRIAL APPLICABILITY

This invention can be utilized for a construction machine provided with a heat exchanger and a cooling fan that cool the heat exchanger.

The invention claimed is:

1. An arrangement structure of a cooling fan configured such that, in a construction machine equipped with a heat exchanger arranged in an accommodating chamber having an opening part, an openable/closable cover for covering the opening part so as to be freely openable and closable, and the cooling fan for supplying cooling air to the heat exchanger, upon arranging the cooling fan on an outdoor side of the heat exchanger, the heat exchanger is arranged at a position facing the openable/closable cover in a closed state, and the cooling fan is mounted in the openable/closable cover, wherein in the closed state of the openable/closable cover, the cooling fan faces the heat exchanger to supply cooling air; on the other hand, in an open state of the openable/closable cover, the cooling fan mounted in the openable/closable cover is separated from the heat exchanger to allow the heat exchanger to be accessible from the opening part, wherein on the openable/closable cover on the outer peripheral side of the cooling fan, there is provided a duct member which forms an air duct between the heat exchanger and the cooling fan by abutting on the outer peripheral side of the heat exchanger in the closed state of the openable/closable cover, and there is provided an airtight member in an abutting part between the duct member and the heat exchanger.

2. The arrangement structure of cooling fan according to claim 1, wherein the openable/closable cover is of a closed cross-section structure provided with an inner side surface and an outer side surface, and the cooling fan is mounted on the inner side surface of the openable/closable cover; on the other hand, the outer side surface of the openable/closable cover has ventilation holes through which the cooling air passes.

3. The arrangement structure of cooling fan according to claim 2, wherein the cooling fan is mounted on the inner side surface of the openable/closable cover, in a state where the most part is fit into a space part formed between the inner side surface and the outer side surface of the closed cross-section structure.

4. The arrangement structure of cooling fan according to claim 1, wherein on an outer peripheral side of the heat exchanger, there is provided a duct member which forms an air duct between the heat exchanger and the cooling fan by abutting on the openable/closable cover on the outer peripheral side of the cooling fan in the closed state of the openable/closable cover; on the other hand, there is provided an airtight member at an abutting part between the duct member and the openable/closable cover.

5. The arrangement structure of cooling fan according to claim 1, wherein the cooling fan is an electric fan driven by an electric motor.

6. The arrangement structure of cooling fan according to claim 1, wherein a plurality of cooling fans is are mounted in the openable/closable cover.

7. The arrangement structure of cooling fan according to claim 1, wherein the openable/closable cover is supported in an openable/closable and swingable manner via a hinge, on a heat exchanger or a heat exchanger supporting member for mounting and supporting the heat exchanger onto an accommodating chamber.

* * * * *